INVENTOR.
JOSEPH W. SIMON
BY
John H. Gallagher
ATTORNEY

Oct. 4, 1966 J. W. SIMON 3,277,399

BROADBAND MULTI-PORT CIRCULATOR HAVING REAL AND REACTIVE COMPONENT MATCHING STRUCTURES IN THE TRANSMISSION LINES

Filed April 16, 1964 3 Sheets-Sheet 2

INVENTOR.
JOSEPH W. SIMON
BY
John H. Gallagher
ATTORNEY

INVENTOR.
JOSEPH W. SIMON
BY
John H. Gallagher
ATTORNEY 3,277,399

BROADBAND MULTI-PORT CIRCULATOR HAVING REAL AND REACTIVE COMPONENT MATCHING STRUCTURES IN THE TRANSMISSION LINES

Joseph W. Simon, Dunedin, Fla., assignor to Sperry Rand Corporation, Great Neck, N.Y., a corporation of Delaware Filed Apr. 16, 1964, Ser. No. 360,256
7 Claims. (Cl. 333—1.1)

This invention relates to means for increasing the operating bandwidth of multi-port circulators, and more particularly to a novel construction and arrangement of matching structures which are located in each arm of the multi-port circulator intermediate the common junction loaded with gyromagnetic material and the respective connecting terminal of each arm.

Multi-port circulators have found extensive use as duplexers, switches, isolators, and other non-reciprocal transmission line devices. One of the popular forms of the circulators is the three or four port common junction circulator built in a TEM type of transmission line, the Y-junction strip transmission line circulator being a common example. Among the attractive features of the TEM mode common junction circulators are their small size and their ruggedness and durability. One factor, however, that has restricted their use is that the circulators ordinarily do not operate satisfactorily over a sufficiently wide frequency range to be useful in all possible applications. As is known, the successful operation of a Y-junction circulator requires that the gyromagnetic material positioned in the junction must be exceedingly well matched to all of the transmission line arms common to that junction. As the quality of the impedance match between the loaded junction and the transmission line arms decreases, the isolation and circulation properties of the device deteriorate. Heretofore it has been difficult to achieve an impedance match between the loaded junction and the arms of the device over a frequency range that approaches an octave bandwidth.

An important development in the broadbanding of multi-port circulators was the disclosure by Humphreys and Davies in an article on pages 551–554 of the November 1962 issue of the "IRE Transactions on Microwave Theory and Techniques," that it is not necessary to obtain complete matching by means of the geometry and parameters of the loaded junction itself, but that reciprocal matching elements may be used external to the loaded junction. Thus by being able to utilize external matching structures an added flexibility is afforded in the design of these devices. In order that the aforementioned advantageous features of the circulator not be sacrificed at the expense of achieving wide band operation, it is necessary that the structures used in achieving the wide band impedance match be compatible with the small, compact, and durable physical structure of the devices, and further, the manufacture of such broadband devices must not be unduly complicated.

It therefore is an object of this invention to provide a novel arrangement of impedance matching means that are external to a ferrite loaded junction for broadbanding the operation of a multi-port circulator.

A further object of this invention is to provide simple and physically rugged impedance matching means for permitting broadbanding operation between a low impedance ferrite loaded transmission line junction and a plurality of transmission line arms coupled thereto.

Another object of this invention is to provide a combination of impedance matching means for a multi-port common junction circulator that cooperates both electrically and physically to achieve excellent electrical and physical properties.

Another object of this invention is to provide novel impedance matching means incorporating a series stub and a quarter wave dielectric impedance transformer that cooperate both electrically and physically to provide a small, rugged, broadband, multi-port, common-junction circulator.

These and other objects of the invention, which will become apparent from a reading of the specification and claims below, are achieved in accordance with the illustrated embodiment of the invention by providing in each transmission line arm of a strip transmission line Y-junction circulator a dielectric intermediate impedance transformer. The dielectric intermediate impedance transformer functions to match the real part of the impedance presented by the ferrite in the junction to the real part of the transmission line impedance. However, the reactive portions of the impedances remain unmatched so that the operating characteristics of the circulator still may vary considerably over the desired operating bandwidth. A series resonant circuit in the form of an open circuited quarter wavelength stub is provided in the strip conductor of each arm to provide a reactance whose variation with frequency is approximately equal in magnitude and opposite in sense to that presented by the combination of the loaded junction and the dielectric impedance transformer. This then cancels the reactive impedance components and substantially matches the transmission line arms to the ferrite loaded junction throughout an extremely wide operating frequency range. The stub in each transmission line arm is formed by a narrow break, or space, in the center strip conductor and by a conductive member that is conductivety secured to the outermost portion of the strip and extends in overlaying relationship to the innermost portion of the center strip. This innermost portion is provided with a longitudinally extending recess to receive the conductive member therein. The conductive member is insulated from the recess and its length is chosen so that it is approximately one quarter wavelength long at the center of the desired operating frequency range. The center strip conductors with the stubs formed therein are physically supported between the ground plane conductors by the dielectric members which function as the intermediate impedance transformers.

The invention will be described by referring to the accompanying drawings, wherein.

Figure 1:
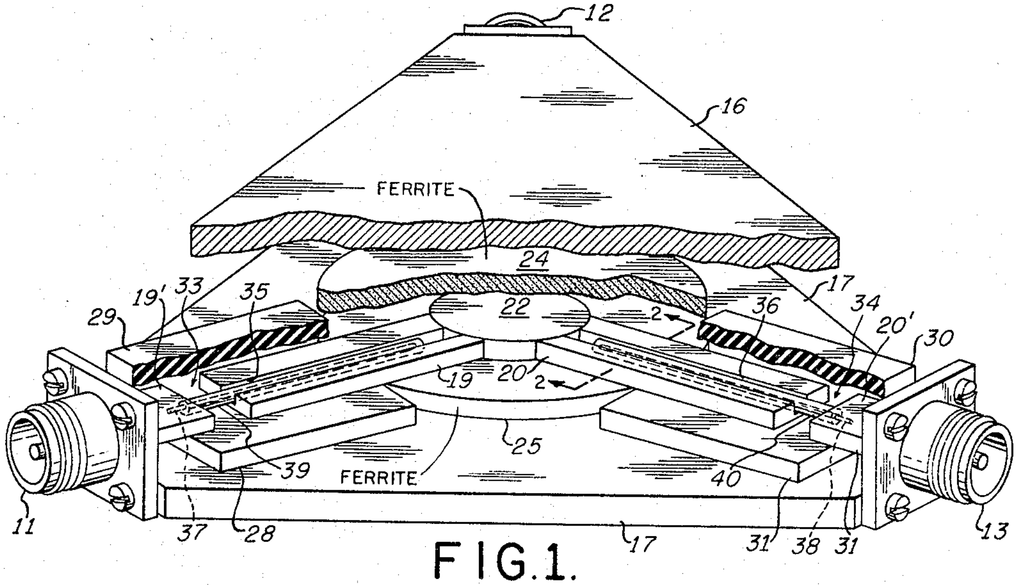
FIG. 1 is a perspective view, partially broken away, illustrating a strip transmission line circulator constructed in accordance with the teaching of this invention.

Referring now in detail to FIG. 1, the Y-junction circulator constructed in accordance with this invention is seen to comprise the three coaxial line connectors 11, 12 and 13 which comprise the three ports of the circulator. Conductive plates 16 and 17 which are substantially identical in shape, form the conductive ground planes which together with the symmetrically arranged center strip conductors 19, 20, and 21 (not illustrated) form strip transmission lines that extend between said connectors 11, 12 and 13 and the conductive disc 22 that comprises the common junction of said strip transmission lines. Disposed symmetrically above and below conductive disc 22 are respective discs 24 and 25 of a gyromagnetic material such as ferrite or garnet materials that are well known for use in these types of devices. Gyromagnetic discs 24 and 25 are magnetized in a direction parallel to their axes by suitable means, not illustrated, to achieve optimum circulating characteristics, in accordance with procedures well understood in the art. A pair of blocks 28 and 29 of a low loss dielectric material physically support the center conductor 19 between the ground planes 16 and 17, and a similar pair of dielectric blocks 30 and 31 support center conductor 20 between said ground planes. Another pair of dielectric blocks, not illustrated, is associated with the third arm of the circulator. The dielectric constant of the dielectric blocks and their lengths along their respective transmission line arm are proportional so that each pair of dielectric blocks functions as a quarter wavelength impedance transformer.

Figure 2:
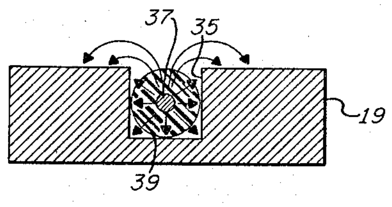
FIG. 2 is a sectional view of a center strip conductor of the device of FIG. 1, taken at section 2—2 thereof.

As illustrated in FIG. 1, the strip conductors 19 and 20 are characterized by having the respective gaps 33 and 34 therein so that the respective center conductors actually are comprised of two spaced conductors 19, 19′ and 20, 20′. The inwardly disposed portions of said center conductors 19 and 20 are provided with respective grooves or slots 35 and 36 which may be stamped or milled along the central axis of the flat conductors (see FIG. 2). Spanning the gaps 33 and 34 and disposed within the slots 35 and 36 are conductive wires 37 and 38 which are illustrated in FIG. 1 by the broken lines, and which are conductively connected to the outwardly disposed portions 19′ and 20′ of the center conductors. Each of the conductive wires 37 and 38 is electrically insulated from the strip conductors 19 and 20 by means of respective insulating coatings 39 and 40 which may be of any suitable dielectric material. The inwardly disposed portions of each of the conductive wires 37 and 38 are open circuited and each wire has an electrical length substantially equal to a quarter wavelength at a frequency in the central region of the desired operating frequency band. Referring to FIG. 2 it may be seen that although the conductive wire 37 is not completely enclosed by the center strip conductor 19, the electric field lines still will close on the strip conductor 19 since all other conductive surfaces are far removed from the wire 37. Therefore, the arrangement is substantially the same as if the wires 37 and 38 were completely enclosed by the center conductors 19 and 20. The third arm of the circulator that is not illustrated in constructed in the same manner as just described.

The stubs formed by conductive wires 37 and 38, and the third wire which is not illustrated, should be located physically close to the junction formed by conductive disc 22 so that no appreciable impedance transformation will result due to intervening line lengths. Conductors 37 and 38 therefore comprise open circuited quarter wavelength series stubs connected in the center conductors of each of the strip transmission lines that comprise the arms of the multi-port junction.

Thus it may be seen from the illustration of FIG. 1 that the matching structure in each arm is comprised of the dielectric blocks and the open circuited series stub, and that these structures do not significantly add to the size or weight of the device. By providing the groove or slot in the inner portions of center conductors 19 and 20, and by merely laying the conductive members 37 and 38 therein to form the series stubs, the manufacture and assembly of the devices is not materially complicated and may be performed by relatively unskilled labor. The pairs of dielectric members, such as members 28 and 29, completely fill the space between the ground planes 16 and 17 and the center conductors 19 and 19′, thereby providing a rigid and secure physical arrangement for supporting center conductors 19 and 20 and the conductive wires 37 and 38, and this is in addition to providing the advantageous electrical characteristics of an impedance transformer. It thus may be seen that the dielectric blocks and the series stubs cooperate both electrically and physically to provide a compact, rugged, and broadband circulator.

As an alternative to the individual dielectric blocks illustrated in FIG. 1, dielectric annular rings may be used. In such an arrangement the dielectric rings would completely surround the respective gyromagnetic discs 24 and 25 and would have a radial extent commensurate with the radial dimensions of the dielectric blocks illustrated in FIG. 1.

If for some reason it would be desired, the open circuited quarter wavelength series stub in each of the strip conductors may be replaced by a half wavelength short circuited stubs. This, however, would not be as desirable since the physical length of the arms of the circulator will have to be increased.

Figure 6:
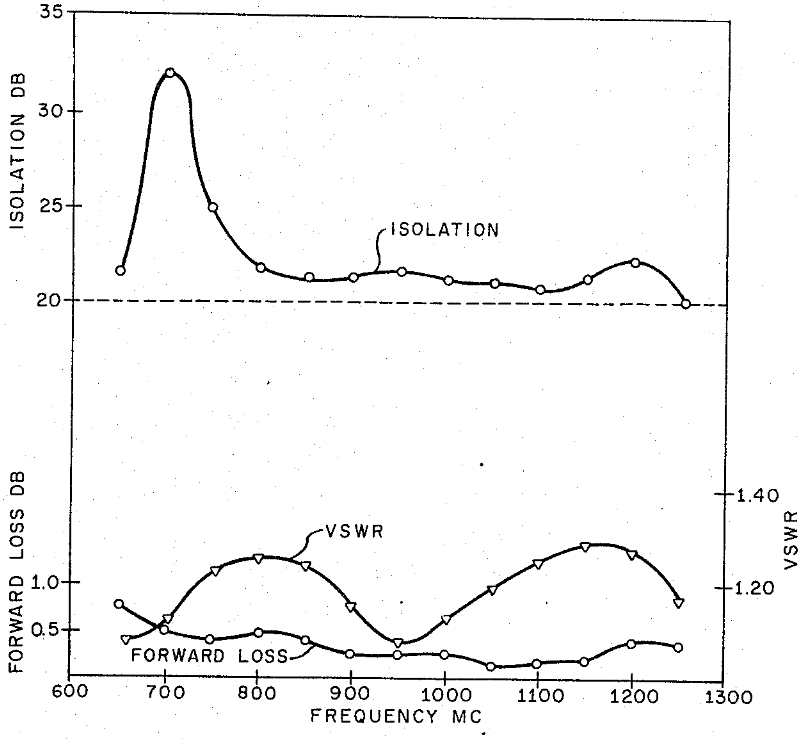
FIG. 6 is a plot of the octave bandwidth operating performance characteristics of the device of this invention.
Figure 3:
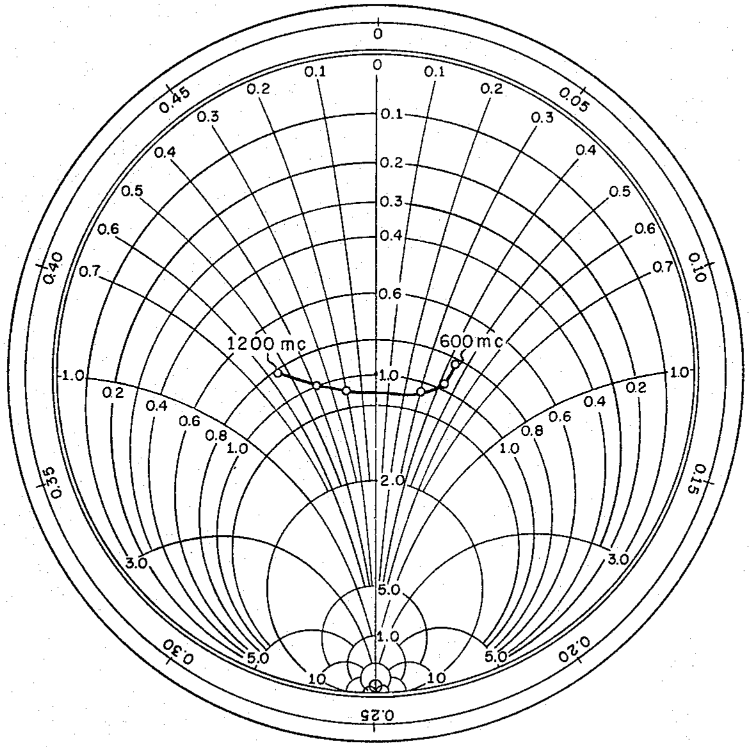
FIGS. 3–5 are impedance plots that are utilized in explaining the operation of the device of this invention.
Figure 4:
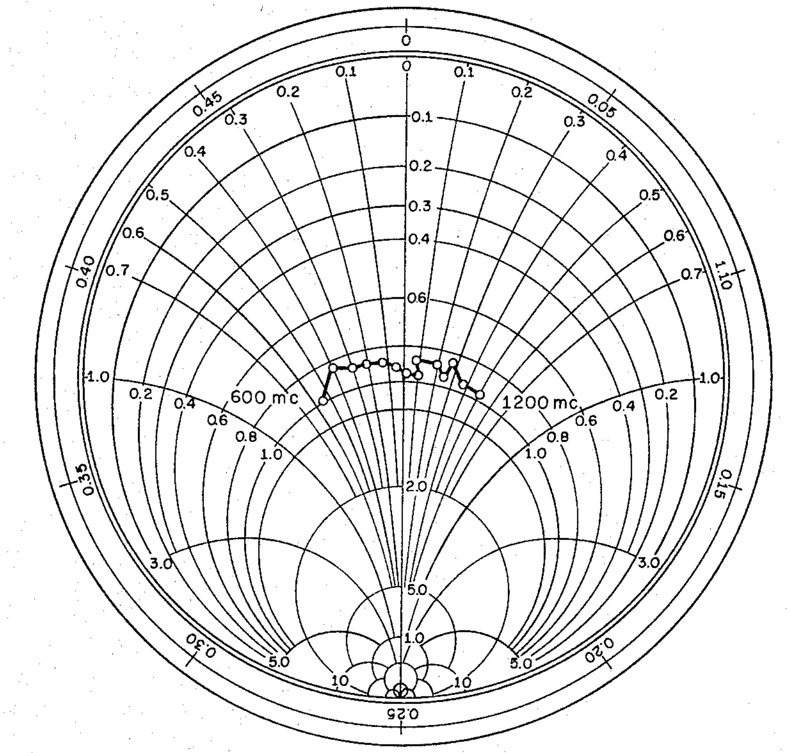
Figure 5:
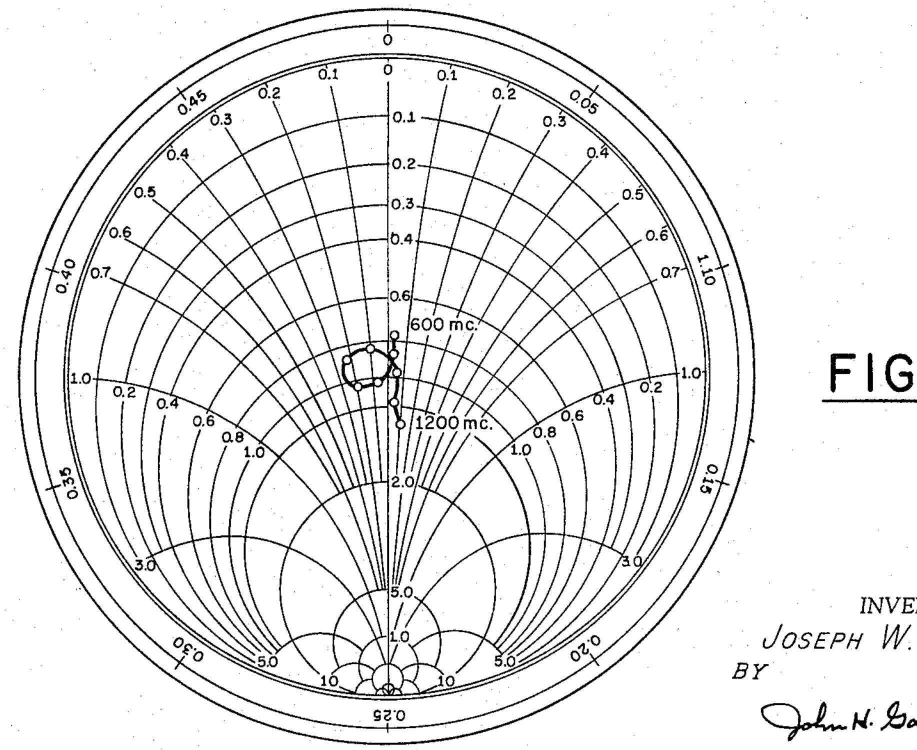

In the design of a circulator of the type illustrated in FIG. 1 the object is to provide a broadband impedance match between the ferrite loaded junction and each of the transmission line arms comprised of the symmetrically arranged center strip conductors and the ground planes 16 and 17. The impedance transformers provided by the dielectric blocks, such as blocks 28 and 29, serve to achieve a match between the real component of the impedance of each of the transmission line arms and the real component of the impedance of the ferrite loaded junction. This is illustrated in the Smith chart of FIG. 3 which was plotted from a circulator of the type illustrated in FIG. 1 but having only the dielectric impedance transformers therein. As seen in FIG. 3 by the fact that the curve lies close to the $1+j0$ point, the real components of the impedances have been reasonably well matched at the central region of the frequency range of 600 megacycles to 1200 megacycles. However, it may be seen that at the upper and lower ends of the frequency range the impedance plot diverges considerably from the matched condition represented by the point $1+j0$. The reactive component of the ferrite in the junction is matched by means of the series stub whose impedance variation over the frequency range is plotted in FIG. 4 wherein it may be seen that such a stub presents a capacitive reactance at the low end of of the band and an inductive reactance at the high end of the band. It further may be seen that the reactances of the stub as illustrated in FIG. 4 are approximately equal in magnitude and opposite in phase to those in the diagram of FIG. 3. Therefore, when the impedance represented by the plots of FIGS. 3 and 4 are combined, the reactive components of the impedances largely cancel, leaving only a slight variation throughout the desired range of frequencies. FIG. 5 is an actual impedance plot of a device as illustrated in FIG. 1, including both the dielectric impedance transformer and the series stub in each arm. As may be seen, throughout the entire frequency range the impedance plot varies but slightly about the point $1+j0$ which indicates the matched condition. This then results in a broadband Y-junction circulator which readily operates over the octave bandwidth of approximately 600 to 1200 megacycles. The actual performance characteristics of a device of this invention are illustrated in FIG. 6, which shows that the device achieves isolation in excess of 20 db over the octave bandwidth of approximately 650 mc.

to 1250 mc. It also may be seen that the v.s.w.r. and forward loss of the device are low over the corresponding octave bandwidth.

The circulator device from which the above data was obtained used an aluminum-substituted yttrium-iron garnet ferrimagnetic material having the composition $3Y_2O_3 \cdot 5$ (20% $Al_2O_3 \cdot$80% $Fe_{1.925}O_3$). The device had the following approximate dimensions:

| | |
|---|---|
| Gyromagnetic discs **24**, **25** | 3.20 in. diameter x 0.219 in. thick. |
| Spacing of ground planes **16**, **17** | 0.500 in. |
| Center strip conductors **19**, **20**, **21** | 0.550 in. wide x 0.062 in. thick. |
| Diameter of center conductive disc **22** | 2.00 in. |
| Width of gaps **33**, **34** in center conductors | 0.050 in. |
| Size of wires **37**, **38** | No. 22 size wire, 1.25 in. long. |
| Diameter of dielectric sleeves **39**, **40** (Teflon) | .050. |
| Slots **35**, **36** | 0.052 in. wide x 0.052 in. deep. |
| Magnetizing field strength | 190 gauss. |

A consideration of the properties of the gyromagnetic material will aid in achieving the optimum bandwidth. For example, for operation below gyromagnetic resonance, the saturation magnetization of the material should be large and the linewidth and loss tangent should be small.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a multi-terminal circulator adapted to operate over a broad range of frequencies, the combination comprising, a plurality of electromagnetic wave transmission lines each having a respective end connected to a common transmission line junction located on an axis, gyromagnetic material disposed in said common junction for exhibiting the gyromagnetic effect to electromagnetic waves in said range of frequencies, said junction with the gyromagnetic material therein presenting an impedance characteristic throughout said range of frequencies that differs from that of the respective ones of said transmission lines, an impedance transformer in each of said transmission lines for effecting a condition of substantial impedance match between the real component of the respective transmission line impedance and the real component of the impedance presented by said junction with the gyromagnetic material therein, and a series resonant circuit connected in series in each of said transmission lines for effecting a condition of substantial impedance match between the reactive component of the respective transmission line impedance and the reactive component of the impedance presented by said junction with the gyromagnetic material therein.

2. In a multi-terminal circulator adapted to operate over a broad range of frequencies, the combination comprising, a plurality of TEM mode transmission lines each having a center conductor and a ground conductor and each being connected to a common TEM mode transmission line junction located on an axis, gyromagnetic material disposed at said common junction for exhibiting the gyromagnetic effect to electromagnetic waves in said range of frequencies, said junction with the gyromagnetic material therein presenting an impedance characteristic throughout said range of frequencies that differs from that of the respective ones of said transmission lines, an impedance transformer in each of said transmission lines for effecting a condition of substantial impedance match between the real component of the re spective transmission line impedance and the real component of the impedance presented by said common junction with the gyromagnetic material therein, and a series resonant circuit connected in series in each of said transmission lines for effecting a condition of substantial impedance match between the reactive component of the respective transmission line impedance and the reactive component of the impedance presented by said common junction with the gyromagnetic material therein.

3. The combination claimed in claim 2 wherein said series resonant circuit in each of said transmission lines is an open circuited transmission line stub in series in the center conductor of a respective transmission line, each of said transmission line stubs having an electrical length substantially a quarter wavelength at a frequency in said range of frequencies.

4. The combination claimed in claim 3 wherein said impedance transformers are comprised of members of dielectric material that physically support said series stubs relative to a respective ground conductor.

5. In a strip transmission line multi-port circulator adapted to operate over a broad range of frequencies, the combination comprising, a plurality of transmission line ports angularly disposed about an axis, a plurality of strip transmission lines each having a narrow strip conductor and a ground plane conductor and each coupling a respective one of said ports to a common strip transmission line junction located at said axis, ferrimagnetic material disposed between the conductors at said junction, said strip transmission lines having a different impedance throughout said range of frequencies from that presented by said junction with the ferrimagnetic material therein, dielectric impedance transformer means disposed between said strip conductor and said ground plane of each of the transmission lines at regions intermediate said common junction and a respective one of said ports, said impedance transformer means presenting along each of said lines an impedance which is proportioned to substantially match the real component of the respective transmission line impedance to the real component of the impedance presented by said junction with the ferrimagnetic material therein, an open circuited transmission line stub in series connection in each of said strip transmission lines, each of said stubs in a respective transmission line comprising, first and second longitudinally-spaced flat conductive portions of said strip transmission line, a conductive member conductively connected to a first one of said portions and extending in overlaying relationship to the second one of said portions, the second one of said portions of the strip transmission line having a longitudinally extending recess in the flat surface thereof to receive said conductive member, and means between said conductive member and the second portion of said stub conductor for providing electrical insulation therebetween, whereby said conductive member functions as an open circuited transmission line stub, said conductive member having an electrical length substantially equal to a quarter wavelength at a frequency in said range of frequencies.

6. In a strip transmission line multi-arm circulator adapted to operate over a broad range of frequencies, the combination comprising, a plurality of strip transmission lines angularly disposed with respect to each other and each being connected to a common strip transmission line junction located at an axis, said strip transmission lines being comprised of a plurality of narrow strip conductors and first and second common ground plane conductors in parallel spaced planes on opposite sides of said strip conductors, ferrimagnetic material disposed between said ground plane conductors and the common junction of said strip conductors, said strip transmission line each having an impedance characteristic throughout said range of frequencies that differs from that presented by said junction with the ferrimagnetic material therein, dielectric impedance transformer means disposed in each of said transmission lines between the respective strip conductors and said ground planes, each of said dielectric impedance transformer means having an electrical length substantially a quarter wavelength long at a frequency in said range of frequencies and each having an impedance which is proportioned to substantially match the real component of the respective transmission line impedance to the real component of the impedance presented by said junction with the ferrimagnetic material therein, an open circuited quarter wavelength transmission line stub series connected in each of said strip transmission lines, each of said stubs comprising, first and second longitudinally spaced portions of a respective strip conductor, a conductive member conductively connected to a first one of said portions and extending in overlaying relationship to the second one of said portions, the second one of said portions having a longitudinally extending recess therein to receive said conductive member, means between said conductive members and the second portion of the respective strip conductor for providing electrical insulation therebetween, whereby said conductive member functions as an open circuited transmission line stub, said conductive member having an electrical length substantially equal to a quarter wavelength at a frequency in said range of frequencies to provide a reactive impedance characteristic throughout said range of frequencies to substantially effect an impedance match between the reactive component of the respective transmission line impedance and the reactive component of the impedance presented by said junction with the ferrimagnetic material therein.

7. The combination claimed in claim 6 wherein, said dielectric impedance transformer means in each of said transmission lines is comprised of first and second rigid dielectric members that extend completely between a respective ground plane and the spaced region of the strip conductor, thereby to securely support said spaced strip conductor.

References Cited by the Examiner

UNITED STATES PATENTS

| | | | |
|---|---|---|---|
| 3,085,212 | 4/1963 | Clark et al. | 333—1.1 |
| 3,165,711 | 1/1965 | Drumheller et al. | 333—1.1 |

HERMAN KARL SAALBACH, *Primary Examiner.*

P. L. GENSLER, *Assistant Examiner.*